United States Patent [19]

Buie

[11] Patent Number: 5,632,856

[45] Date of Patent: May 27, 1997

[54] METHOD FOR REMOVING TONER FROM COPY PAPER

[76] Inventor: Richard B. Buie, 3300 Westminster Ave., Dallas, Tex. 75205

[21] Appl. No.: 283,505

[22] Filed: Aug. 1, 1994

[51] Int. Cl.[6] ........................................... D21B 1/08
[52] U.S. Cl. ................... 162/4; 162/206; 15/3; 134/5; 134/9; 134/38; 134/122 R
[58] Field of Search .................. 162/4, 5, 6, 7, 162/8, 205, 206; 355/208; 209/5, 34; 15/3; 134/122 R, 9, 5, 6, 38

[56] References Cited

U.S. PATENT DOCUMENTS

| | | | |
|---|---|---|---|
| 3,674,736 | 7/1972 | Lerman et al. | 260/41 R |
| 4,818,342 | 4/1989 | Wagle et al. | 162/207 |
| 4,872,777 | 10/1989 | Dalbke | 401/198 |
| 5,019,249 | 5/1991 | Sugai et al. | 209/534 |
| 5,113,221 | 5/1992 | Kotani et al. | 355/208 |
| 5,178,669 | 1/1993 | Watanabe | 106/21 R |
| 5,229,350 | 7/1993 | Shinagawa | 503/201 |
| 5,405,726 | 4/1995 | Abe et al. | 430/97 |

FOREIGN PATENT DOCUMENTS

| | | |
|---|---|---|
| 3049413 | 7/1982 | Germany. |
| 4300395 | 10/1992 | Japan. |
| 4327299 | 11/1992 | Japan. |

OTHER PUBLICATIONS

Wall Street Journal, (Aug. 20, 1993), "Tired of Shredding?" by David P. Hamilton.
Science & Tech. Magazine, (Jan. 1994), Finally a way to Recycle by Ruth Coxeter.
Ricoh–Press Release, (Aug. 1993), "Tech. Allowing Copier Paper" by Ricoh Corp.

*Primary Examiner*—Donald E. Czaja
*Assistant Examiner*—Dean T. Nguyen

[57] ABSTRACT

A method of removing plastic ink film from a sheet of copy paper by preheating the paper sheet in a preheating chamber to loosen the plastic ink film from the paper sheet followed by contacting the heated paper sheet with an adhesive surface by pressing the adhesive surface against the heated paper sheet, fusing the plastic ink film to the adhesive surface and then peeling the heated paper sheet from the adhesive surface so that the plastic ink film is removed from the paper sheet. The fused plastic ink film is then removed from the adhesive surface by cleaning and the adhesive roller is made ready for another paper sheet. The paper sheet is then rehumidified, calenderized and treated with white toner to restore whiteness, followed by optical inspection of the paper sheet for the presence of holes and to determine if the plastic ink film has been removed from the paper sheet. Depending on the optical inspection, the paper sheet is sorted into a rejected or accepted output bin. Both sides of the paper sheet may be treated simultaneously by this method.

1 Claim, 1 Drawing Sheet

METHOD FOR REMOVING TONER FROM COPY PAPER

BACKGROUND OF THE INVENTION

1. Field of the Invention

This invention relates to a method for removing toner from a sheet of paper by heating and contacting the paper containing toner with an adhesive surface so that the paper can be reused.

2. Description of the Prior Art

Two principal uses of office paper in the U.S. are in photocopiers and in printers which use a laser printing technology. Both of these processes use a toner material to create the image. The various types of toners are thermo-setting plastic resins with carbon black and other minor constituents to control flow, electrical and magnetic properties. This toner is "set" onto the paper by using heat to melt the resin forming a solid film adhering to the paper surface.

Approximately 10 million tons of office paper are used annually in the U.S., and the percentage of this paper used in laser-print technology (this term includes photocopy technology) can be as high as 70%.

In addition, approximately 25,000 tons of toner is used annually in the U.S., with a total world use of 50,000 tons annually. Much of the laser printed paper is used for short term purposes and then discarded, creating a large and rapidly growing stream of office wastepaper. It is estimated that this stream of office waste will reach 12 million tons per year in the U.S. Similar trends are occurring in developed countries around the world.

This stream of laser-print wastepaper contains very high quality, bleached cellulose fibers derived from chemically pulping wood chips. To produce such high quality papers it typically requires four tons of green wood to produce one ton of paper. Unfortunately, the toner has been found to be very tenacious in its adhesion to the fiber in conventional recycling and deinking processes, and even when detached during conventional recycling the ink particles are large and difficult to separate from the pulp slurry. These deinking processes function in the wet state after the paper has been broken down into individual fibers by mechanical action in large repulper devices. This type of process is only performed at large manufacturing sites, and is not suitable for office environments.

There are also methods of ink removal which do not function in the wet state and do not require that the paper be broken down into individual fibers by mechanical action in large repulper devices, such as the use of solvents or solvent recovery employed in the patent to Mitsubishi Electronic Corp.(JP04327299).

SUMMARY OF THE INVENTION

The invention allows for the deinking and reuse of paper sheets to reduce the cost of new paper and eliminates the necessity of shipping used paper to recycling facilities for treatment in the wet state.

The invention uses a softening and lifting off technique which reduces the adhesion of the plastic ink film or toner to the paper sheet. This liftoff process is not sensitive to the ink particle size, and thus the two problems encountered with conventional deinking, namely strong adhesion and large, tough ink particles, are avoided with dry process of this invention. In addition, the process of this invention is distinguished from other dry state methods and does not use solvents or solvent recovery such as in the aforementioned Mitsubishi patent (JP04327299).

According to the invention, the paper sheet containing plastic ink film is heated in a preheating chamber over a period of time sufficient to reduce the adhesion of the plastic ink film to the paper sheet. After heating, the heated paper sheet is then placed in contact with an adhesive surface, such as roller or belt, by pressing the adhesive surface against the heated paper sheet to remove the plastic ink film from the heated paper sheet. The plastic ink film is fused to the adhesive surface and the heated paper sheet is peeled from the adhesive surface so that the ink film is removed from the paper sheet. The plastic ink film fused to the adhesive surface is removed by cleaning.

DESCRIPTION OF THE PREFERRED EMBODIMENT

Figure 1:
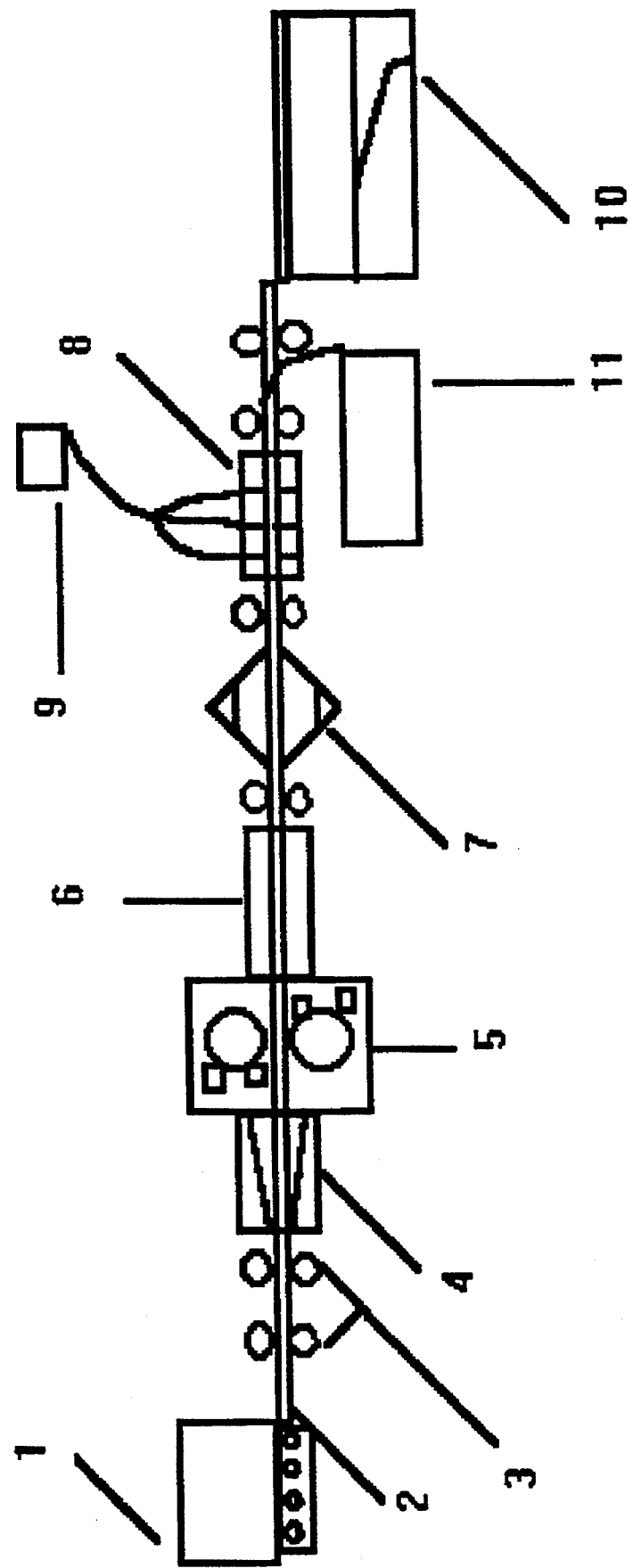
FIG. 1 is a sectional view showing the configuration of an apparatus for the method of plastic ink film removal of the invention.

Referring to FIG. 1 the preferred embodiment of the invention is described as follows:

Paper containing toner for removal is fed from a storage bin 1 to a paper track 2 and passes through flattening rollers 3 prior to entering the preheating chamber 4 where heat is applied to the paper sheet containing toner to reduce the adhesion of the plastic ink film to the paper sheet. After the heating step is completed the paper sheet is contacted with the adhesive surface of adhesion rollers 5, equipped with toner cleaners, by pressing the adhesive surface of the rollers 5 against the heated paper sheet, then peeling the heated paper sheet away from rollers 5 so that the plastic ink film is removed from the heated paper sheet and is fused to the adhesive surface of the rollers 5. The discrete application of heat from the preheating chamber 4 and pressure from the rollers 5 will smooth out creases, flatten the paper sheet, soften and reduce the adhesion of the film to the paper sheet and improve adhesion of the plastic ink film to the adhesion rollers 5. The rollers 5 are then cleaned of fused plastic ink film and made ready for the next paper sheet. After peeling the paper sheet from the adhesion rollers 5, the paper sheet is reconditioned by the rehumidification and calendering chamber 6 to reduce curl and roughness, and white toner is applied to the paper sheet by electrostatic coating with clay-starch polymer blends by means of the treatment domes 7 to further improve the paper surface quality.

Finally, an optical inspection is performed on the paper sheet by a series of optical inspectors 8 and a control sensor 9 so that an excessive amount of holes or residual plastic ink film on the paper sheet will result in rejection of a paper sheet. Depending on the optical inspection, the paper sheet is either fed into an accepted paper bin 10 or a rejected paper bin 11. The accepted paper bin 10 can be comprised of a bottom drawer cartridge adapted to fit into the feeding paper trough of a conventional copier machine. Rejected paper sheets can be sent to a conventional paper recycling facility or used when the lower quality condition of a rejected paper sheet is acceptable.

The success of the process of the invention will be somewhat dependent on the plastic ink film and type of paper used, and on the final quality required as circumstances dictate. To achieve best performance it may be necessary to adjust process conditions, such as the temperature of the preheating chamber and pressure of the adhesion rollers depending on the particular toner-paper combination used.

What is claimed is:

1. A method of removing plastic ink film from a paper sheet consisting essentially of:

(a) heating the paper sheet in a preheating chamber over a period of time sufficient to reduce adhesion of the plastic ink film to the paper sheet, (b) contacting the heated paper sheet with an adhesive surface by pressing the adhesive surface against the heated paper sheet to remove the plastic ink film from the heated paper sheet, (c) fusing the plastic ink film to the adhesive surface, (d) peeling the heated paper sheet away from the adhesive surface to form a paper sheet with removed ink film, and (e) removing the fused plastic ink film from the adhesive surface by cleaning.

* * * * *